US007593479B2

(12) United States Patent
Dagdeviren (10) Patent No.: US 7,593,479 B2
(45) Date of Patent: *Sep. 22, 2009

(54) PRECODING FOR A NON-LINEAR CODEC (75) Inventor: Nuri R Dagdeviren, Holmdel, NJ (US)

(73) Assignee: Agere Systems Inc., Allentown, PA (US)

(*) Notice: Subject to any disclaimer, the term of this patent is extended or adjusted under 35 U.S.C. 154(b) by 11 days.

This patent is subject to a terminal disclaimer.

(21) Appl. No.: 11/932,243

(22) Filed: Oct. 31, 2007

(65) Prior Publication Data
US 2008/0049867 A1 Feb. 28, 2008

Related U.S. Application Data (63) Continuation of application No. 09/540,475, filed on Mar. 31, 2000, now Pat. No. 7,292,648.

(60) Provisional application No. 60/169,896, filed on Dec. 9, 1999.

(51) Int. Cl.
H04L 25/08 (2006.01)
(52) U.S. Cl. ..................................... 375/296
(58) Field of Classification Search ................. 375/233, 375/242, 254, 261, 265, 296, 298
See application file for complete search history.

(56) References Cited

U.S. PATENT DOCUMENTS

| 5,181,112 | A | * | 1/1993 | Citta et al. | 348/470 |
| 5,311,547 | A | * | 5/1994 | Wei | 375/290 |
| 5,394,437 | A | | 2/1995 | Ayanoglu et al. | |
| 5,396,519 | A | | 3/1995 | Betts et al. | |
| 5,406,583 | A | | 4/1995 | Dagdeviren | |
| 5,528,625 | A | | 6/1996 | Ayanoglu et al. | |
| 5,559,561 | A | * | 9/1996 | Wei | 348/470 |
| 5,602,583 | A | * | 2/1997 | Citta | 348/21 |

(Continued)

Primary Examiner—Young T. Tse (57) ABSTRACT

A precoding system to achieve rates higher than 33.6 kbps in the analog modem to digital modem direction. The precoding system modifies the standard THP algorithm to adapt it for use in PCM modems. The present invention overcomes the above-described difficulties by preceding an upstream signal before transmission. In one aspect of the invention, the present invention provides a precoder for generating a mapped constellation signal from an input signal. In one embodiment, the precoder includes a processor configured to generate the mapped constellation signal from the input signal by mapping input signals in a plurality of distinct ranges onto a basic level. The processor is configured to map the plurality of distinct ranges onto the basic level following different arithmetic rules for at least two of the plurality of distinct ranges.

20 Claims, 4 Drawing Sheets

U.S. PATENT DOCUMENTS

| | | |
|---|---|---|
| 5,809,033 A | 9/1998 | Turner et al. |
| 5,831,561 A | 11/1998 | Cai et al. |
| 5,854,812 A | 12/1998 | Huber et al. |
| 5,878,077 A | 3/1999 | Betts |
| 5,881,108 A | 3/1999 | Herzberg et al. |
| 5,970,100 A | 10/1999 | Olafsson et al. |
| 6,061,407 A | 5/2000 | Cherubini et al. |
| 6,084,535 A | 7/2000 | Karabed et al. |
| 6,198,776 B1 * | 3/2001 | Eyuboglu et al. ........... 375/286 |
| 6,201,836 B1 * | 3/2001 | Kim ........................... 375/265 |
| 6,393,029 B1 | 5/2002 | Turner et al. |
| 6,418,170 B1 * | 7/2002 | Maurer et al. ............... 375/244 |
| 6,532,267 B1 | 3/2003 | Heegard |
| 6,798,851 B1 * | 9/2004 | Dagdeviren ................. 375/340 |
| 7,085,316 B1 * | 8/2006 | Kim et al. ................... 375/222 |
| 7,099,403 B1 * | 8/2006 | Dagdeviren ................. 375/296 |
| 7,292,648 B1 | 11/2007 | Dagdeviren |
| 2002/0118702 A1 | 8/2002 | Turner et al. |

\* cited by examiner

PRECODING FOR A NON-LINEAR CODEC

CROSS REFERENCE TO RELATED APPLICATIONS

This application is a continuation of file Ser. No. 09/540,475 filed on Mar. 31, 2000 now U.S. Pat. No. 7,292,648, entitled "PRECODING FOR A NON-LINEAR CODEC," issued on Nov. 6, 2007 by Nuri R. Dagdeviren, and claims the benefit of U.S. Provisional Application No. 60/169,896 filed on Dec. 9, 1999. U.S. Pat. No. 7,292,648 is commonly assigned with the present invention and is incorporated herein by reference as if reproduced herein in its entirety. The present application is also related to U.S. Pat. No. 7,099,403 to Dagdeviren and U.S. Pat. No. 6,798,851 to Dagdeviren.

FIELD OF THE INVENTION

This invention relates to analog modem technology. Specifically, it proposes a new precoding scheme to achieve higher rates in the analog modem to digital modem direction.

BACKGROUND OF THE INVENTION

Figure 5:
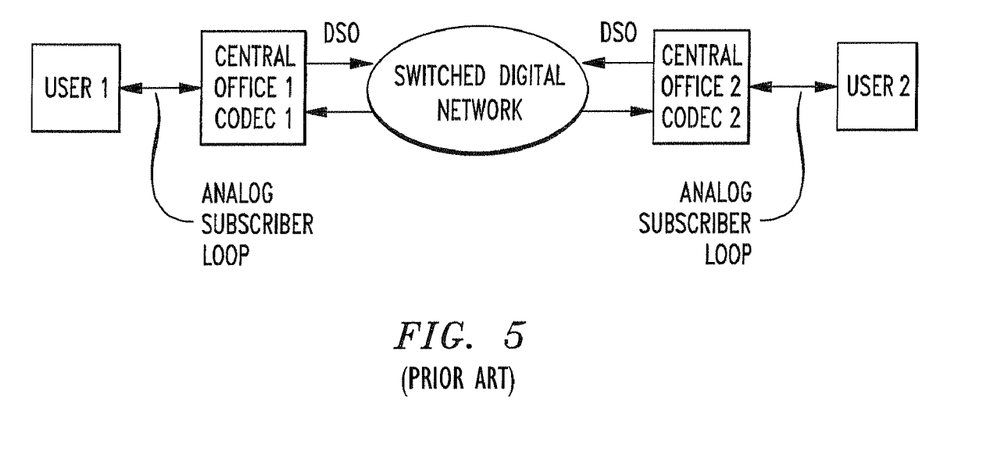
FIG. 5 is a block diagram of a conventional Public Switched Telephone Network.

FIG. 5 shows the basic elements of an end-to-end transmission within the Public Switched Telephone Network (hereinafter "PSTN"). The PSTN shown includes first and second Users, first and second Central Offices, and a Switched Digital Network. An Analog Subscriber Loop connects the Users to their respective Central Offices, and the Switched Digital Network connects the Central Offices together. The Analog Subscriber Loops are conventional twisted pairs that transport analog signals from the User Equipment to the associated local Central Office. At the Central Office, the analog signals are converted to 64 kbps DS0 digital data streams by a channel unit filter and codec, which together implement a bandlimiting filter followed by a non-linear encoding rule and subsequent analog to digital conversion. The resulting DS0 streams are transported to their respective destination Central Office via the Switched Digital Network.

At the Central Office 1, User's 1 loop signal is first bandlimited. The bandlimited analog signal is then sampled at a rate of 8 k samples/second, and then converted into an 8-bit digital representation using a nonlinear mapping rule referred to as PCM encoding. This encoding is approximately logarithmic, and its purpose is to permit relatively large dynamic range voice signals to be represented with only 8 bits per sample.

Figure 6:
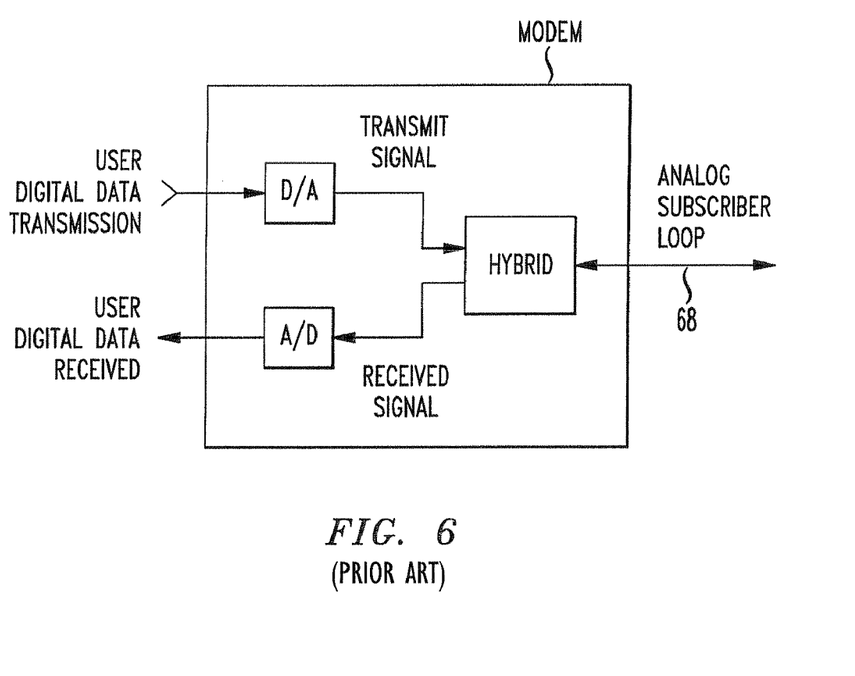
FIG. 6 is a block diagram of a conventional modem.

Users 1 and 2 may use a conventional modem, as shown in FIG. 6, to transmit digital data over the configuration of FIG. 5. The conventional modem encodes the user's digital data into a symbol sequence. The symbol sequence is then represented as an appropriately bandlimited analog signal which can be transmitted over the approximately 3.5 kHz bandwidth available on the end-to-end connection. The exemplary modem of FIG. 6 includes a Digital to Analog converter (i.e. D/A),) an Analog to Digital converter (i.e. A/D), and a hybrid. The A/D and the D/A perform PCM encoding. The non-linearity associated with the PCM coding is incorporated in the circuitry that converts the analog signals to digital signals, and vice-versa. That is, the analog voltage level of the received signal is mapped to the nearest PCM quantization level, and vice versa, so that the PCM quantization levels serve as the channel symbol alphabet.

PCM baseband modulation in the upstream direction, i.e. from User I to the Central Office, presents special equalization problems. For instance, one potential application for PCM baseband modulation in the upstream direction is in conjunction with "56 k" modems. However, "56 k" modems have a zero in the frequency band of interest. The zero at zero frequency comes from the transformer coupling of the analog subscriber loop to the central office equipment. Therefore, telephone lines do not pass DC signals. Low frequencies near DC are also attenuated significantly as to rule out linear equalization of this channel. Moreover, it is not possible to avoid the zero at DC for 56 k modems using pass-band modulation as in the case of earlier V.34 modems because the central site modem is limited to using the sampling rate and quantization levels of the PCM codec at the central office.

One possible way to equalize this channel is to use a linear equalizer to reduce the channel response to a simpler "partial" response that still possesses the zero in the channel but can be dealt with using a non-linear technique such as maximum likelihood sequence (MLSE) decoding or decision feedback equalization (DFE). This however is only possible in the direction of digital modem to analog modem, also referred as the downstream direction. The reason this approach or any linear equalization scheme does not work in the upstream direction is that only PCM codec levels themselves can pass through the PCM codec unscathed. Any filtered version of a sequence of PCM levels will be a linear combination of these levels and in general not be a PCM level itself. When such intermediate levels are quantized by the PCM codec, quantization noise is introduced into the signal erasing any advantage over V.34 techniques.

Accordingly, there exists a need for a system capable of equalizing transmissions from an analog modem.

SUMMARY OF THE INVENTION

The present invention overcomes the above-described difficulties by precoding an upstream signal before transmission. In one aspect of the invention, the present invention provides a precoder for generating a mapped constellation signal from an input signal. In one embodiment, the precoder includes a processor configured to generate the mapped constellation signal from the input signal by mapping input signals in a plurality of distinct ranges onto a basic level. The processor is configured to map the plurality of distinct ranges onto the basic level following different arithmetic rules for at least two of the plurality of distinct ranges.

In another aspect, the invention provides a method of precoding an input signal to generate a mapped constellation signal. The method includes mapping an input signal contained in a first distinct range onto a basic level according to a first arithmetic rule and mapping an input signal contained in a second distinct range onto the basic level according to a second arithmetic rule that differs from the first arithmetic rule.

In yet another aspect, the present invention provides a computer-readable medium having stored thereon a plurality of instructions, the plurality of instructions including instructions that when executed by a processor cause the processor to implement a method of precoding an input signal to generate a mapped constellation signal. The method includes mapping an input signal contained in a first distinct range onto a basic level according to a first arithmetic rule and mapping an input signal contained in a second distinct range onto the basic level according to a second arithmetic rule that differs from the first arithmetic rule.

BRIEF DESCRIPTION OF THE DRAWINGS

The features and advantages of the invention will be apparent from the following description, as illustrated in the accompanying Figures in which like reference characters refer to the same elements throughout the different Figures.

DETAILED DESCRIPTION OF THE INVENTION

The inventor has recognized that one way to overcome the difficulties noted in the background of the invention is to use preceding in the transmitter, in place of MLSE or DFE in the receiver. In this way PCM levels can be used as the symbol constellation. The combination of the precoder and a linear equalizer will eliminate the inter-symbol interference (ISI) introduced by the channel. In this manner signals arriving at the PCM codec will be free of ISI and no quantization noise will be introduced.

The simplest manner of implementing preceding is to implement a feedback filter that equalizes the partial response. This however is not practical in the case where the channel and hence the partial response possesses a zero in the band of interest. The reason is that since the feedback filter equalizes the partial response, it has a very large gain at the frequency where the partial response has a zero. Components in the transmitted signal that correspond to this frequency will be greatly amplified leading to an unstable feedback loop.

Tomlinson Harashma Precoding ("THP") has emerged as an attractive solution for equalization in the presence of severe channel attenuation in the frequency band of interest; See M. Tomlinson "New Automatic Equalizer Employing Modulo Arithmetic" Electronics Letters Vol. 7, pp. 138-139, March 1971, the contents of which are incorporated herein by reference; and See H. Harashima and H. Miyakawa "Matched-Transmission Technique for Channels with Intersymbol Interference" IEEE Trans. Commun. Vol. COM-20, pp. 774-80, August 1972, the contents of which are incorporated herein by reference. THP is equivalent to Decision Feedback Equalization (DFE) in the receiver without the potential problem of error propagation.

The clever solution to the problem of very large gain at frequencies where the partial response has a zero is provided in the THP as follows. Whenever the output of the feedback loop passes a present threshold, the transmitted signal is subjected to a modulo operation which brings it back within range. This removes the instability in the feedback loop of the transmitter. The receiver must also account for the modulo operation in the transmitter. The receiver, since the modulo operation can be expressed as the addition of a constant, will compensate by subtracting the constant from the received signal. The receiver knows when to perform this compensation because whenever the transmitter subtracts the constant to bring the transmitted value to within range, the received value in the receiver will be out of range. When the receiver compensates the received signal by adding the constant, the received signal is brought back within range.

However, the standard THP scheme is not effective for PCM encoding in the upstream direction because the receiver can not implement the modulo compensation without introducing quantization noise. If the transmitter implements the standard THP modulo operation, then the received signal will arrive at the PCM codec with a value that corresponds to a PCM value shifted by a constant. In general it is not possible to find a set of PCM values and a constant such that each PCM value, when shifted by a constant is another PCM value. Thus THP scheme as previously defined is not effective for PCM modems.

This invention modifies the standard THP algorithm to adapt it for use in PCM modems. Instead of an arithmetic modulo operation that is implemented in the transmitter, the invention defines a Discrete Modulo Operation as a function of the constellation of levels chosen. The Discrete Modulo Operation is defined as a mapping from a constellation level outside the basic constellation of levels for the precoder to a constellation level inside the basic constellation of levels for the precoder. The mapping is based upon an index associated with levels in the constellation of levels. This operation performs the function of limiting the amplitude of the transmitted signals, hence removing the instability of the feedback loop, while ensuring that received signals at the PCM codec are always within the PCM level set free of quantization noise. Similarly, a discrete modulo operation is defined for the receiver to map received PCM values correctly into the symbol constellation.

Figure 1:
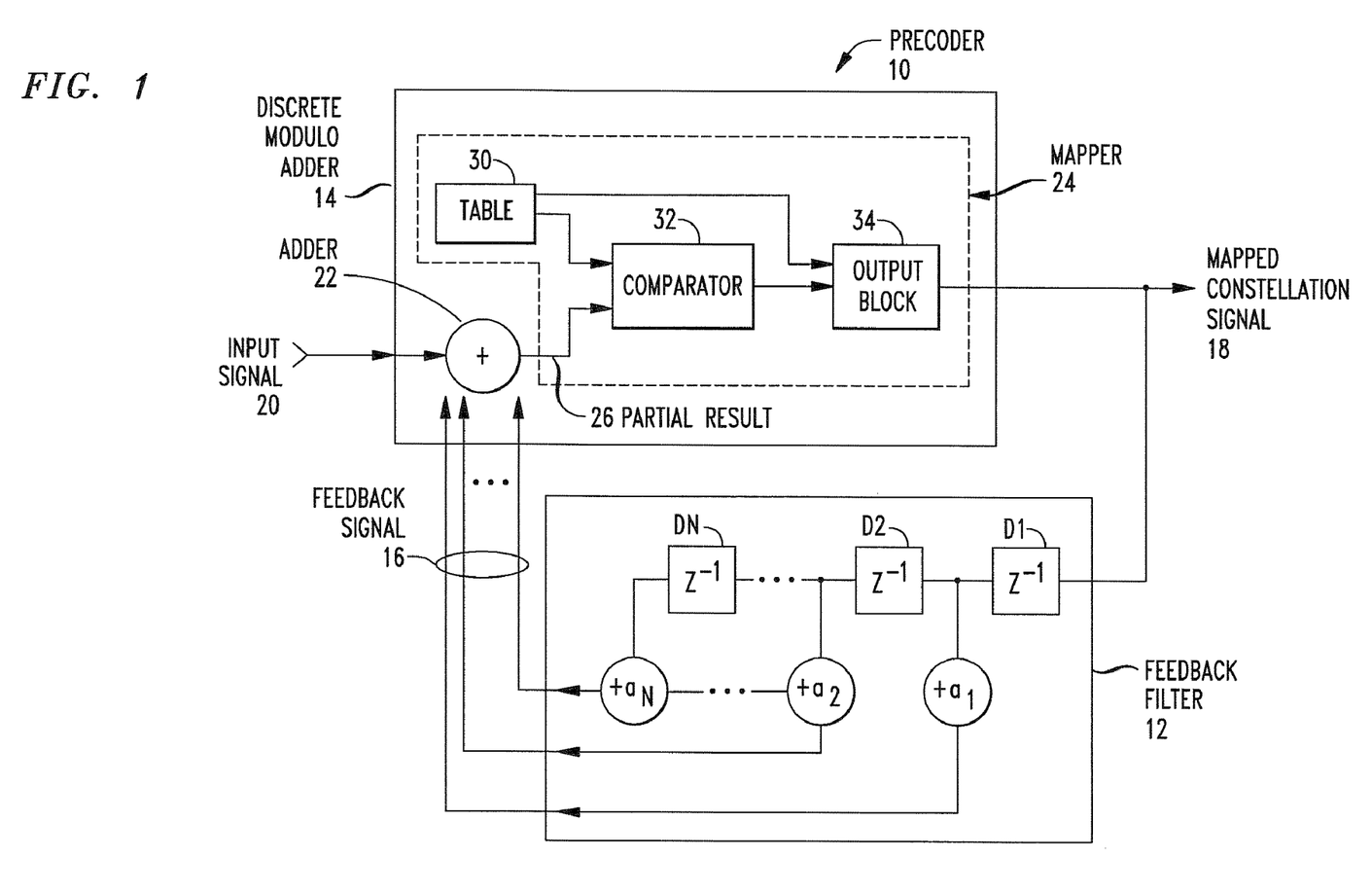
FIG. 1 is a block diagram of a precoder in accordance the present invention.

Accordingly, FIG. 1 illustrates a block diagram of a precoder 10 in accordance with one aspect of the invention. The precoder 10 comprises a feedback filter 12 and a discrete modulo adder 14. The feedback filter 12 generates a feedback signal 16 as a function of a mapped constellation signal 18, and the discrete modulo adder 14 generates the mapped constellation signal 18 as a function of the feedback signal 16 and as a function of an input signal 20 to the precoder 10. The discrete modulo adder 14 utilizes an index 31 (of FIG. 2) to the constellation of levels chosen for the precoder 10, such that the amplitude of the mapped constellation signal 18 is limited.

The discrete modulo adder 14 can also include an adder 22 and a mapper 24. The adder 22 sums together the feedback signal 16 and the input signal 20 to generate a partial result 26. The mapper 24 generates the mapped constellation signal 18 by mapping a partial result 26 outside a basic constellation of levels onto the basic constellation of levels.

As further illustrated in FIG. 1, the mapper 24 can include a table 30 that identifies both the levels inside a basic constellation of levels and those levels outside a basic constellation of levels. The table 30 further identifies the mapping from levels outside the basic constellation to the levels inside the basic constellation as a function of the index 31 associated with the levels in the table 30. Preferably, the levels outside the basic constellation are mapped onto only one level inside the basic constellation.

Figure 2:
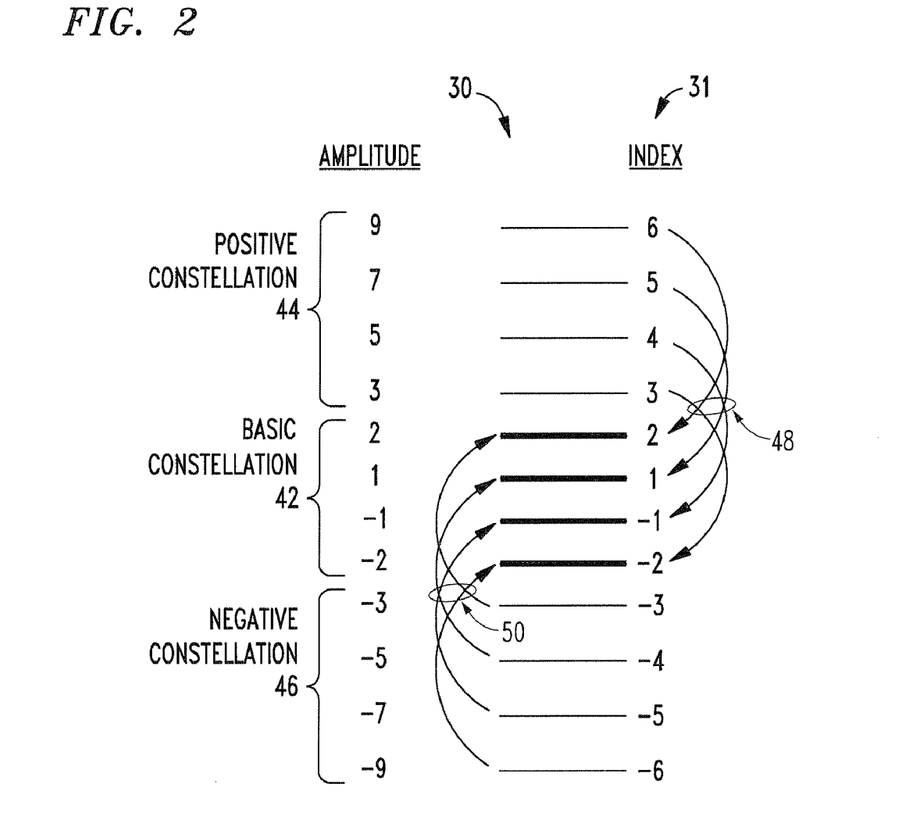
FIG. 2 is a graphical representation of an exemplary table utilized by the precoder of FIG. 1.

FIG. 2 illustrates a graphical representation of an exemplary table 30 utilized by the precoder 10 of FIG. 1. The exemplary table 30 has a total of 12 levels, each level being identified by a horizontal line. The table 30 also includes two columns, one labeled Amplitude and another labeled Index 31. The Amplitude column has 12 entries, one for each level. The Index column also has 12 entries, one for each column. Thus, as shown in FIG. 2, amplitude 9 and index 6 are both associated with the first level; amplitude 7 and index 5 are both associated with the second level; amplitude 5 and index 4 are both associated with the third level; . . . and amplitude −9 and index −6 are both associated with the twelfth level.

The levels in the exemplary table 30 can also be subdivided into three separate constellations: a basic constellation 42, a positive constellation 44, and a negative constellation 46. The basic constellation 42 extends into both the positive and negative directions from an amplitude level of zero. Typically, the basic constellation extends an equal distance from amplitude zero into both the positive and negative directions. The positive constellation 44 extends from the maximum level of the basic constellation upwards, and the negative constellation 46 extends from the minimum level of the basic constellation downwards. For example, as shown in FIG. 2, the basic constellation includes the amplitudes {2,1,−1,−2}, or alternatively the basic constellation includes the indexes{2,1,−1,−2}. The positive constellation includes the amplitudes {3,5,7,9} or the indexes {3,4,5,6}. The negative constellation includes the amplitudes {−3,−5,−7,−9} or the indexes {−3,−4,−5,−6}. In a preferred embodiment of the invention, the basic constellation includes a set of indexes extending from −k to k; the positive constellation includes a set of indexes extending from k+1 to 3 k; and the negative constellation includes a set of indexes extending from −k−1 to −3 k.

The amplitude entries show that the separation between levels in the table may vary, as is found in PCM codec levels. For instance, the separation between levels in the basic constellation 42 of FIG. 2 equals one amplitude, while the separation between levels in the positive constellation 44 equals two amplitudes. In comparison, in a preferred embodiment of the invention, the separation between indexes is a constant, regardless of the constellation. As shown in FIG. 2, the index separation between successive levels always equals one. Accordingly, although the difference in amplitude between the successive levels shown in FIG. 2 may vary, the difference in index between successive levels is a constant.

The exemplary table 30 of FIG. 2 also uses a first set of arrows 48 to show a mapping from levels in the positive constellation 44 to levels in the basic constellation 42. A second set of arrows 50 shows a mapping from levels in the negative constellation 46 to levels in the basic constellation 42. The first set of arrows 48 identifies that the levels associated with indexes {3,4,5,6} in the positive constellation are mapped to the levels associated with indexes {−2,−1,1,2} in the basic constellation, respectively. The second set of arrows 50 identifies that the levels associated with indexes {−3,−4,−5,−6} in the negative constellation are mapped to the levels associated with indexes {2,1,−1,−2} in the basic constellation, respectively. Thus, there is a one-to-one mapping between levels in the positive constellation 44 and the basic constellation 42, and there is another one-to-one mapping between levels in the negative constellation 46 and the basic constellation 42.

In a preferred embodiment of the invention, each of the levels in the positive constellation are mapped onto levels in the basic constellation based on the indexing system chosen. This form of mapping between the basic constellation and those levels outside the basic constellation, based upon the indexes in the constellation, will be referred to as a discrete modulo operation. Preferably, the discrete modulo operation is defied as a shift operation between the indexes in the basic constellation and the indexes outside the basic constellation (i.e. the positive constellation 44 and the negative constellation 46).

An exemplary shift operation is as follows:
if the indexes in the basic constellation are labeled, basic_const, where basic_const goes from −k to k, and
if the indexes in the positive constellation are labeled positive_const, where positive_const goes from k+1 to m,
then the levels in the positive constellation 44 are mapped onto levels in the basic constellation 42 according to the equations:
Index positive_const→positive_const−(2+k); while positive_const>m−k; and
Index positive_const→positive_const−(2*k); while positive_const<=m−k;
Wherein→identifies the mapping function.

For example, the basic constellation might include the indexes {−2,−1,1,2} and the positive constellation might includes the indexes (3,4,5,6). Given this set of constellations, the mapping is calculated as follows:
index 6 maps to 6−(2*k)=6−4=2;
index 5 maps to 5−(2*k)=5−4=1;
index 4 maps to 4−(2*k)−1=4−4−1; and
index 3 maps to 3−(2*k)−1=3−4−1=2.

In an analogous fashion, the indexes in the negative constellation can be mapped onto levels in the basic constellation:
if the indexes in the basic constellation are labeled basic_const, where basic_const goes from −k to k, and
if the indexes in the negative constellation are labeled negative_const, where negative_const goes from −k−1 to −m,
then the levels in the negative constellation 46 are mapped onto levels in the basic constellation 42 according to the equations:
Index negative_const→negative_const+(2+k); while negative_const<−(m−k); and
Index negative_const→negative_const+(2*k)+1; while negative_const>=−(m−k);
Wherein→identifies the mapping function.

This discrete modulo operation performs the function of limiting the amplitude of signals by mapping signals in the table outside the basic constellation onto signals inside the basic constellation. This mapping function allows the precoder 10 to remove the potential instability caused by the feedback filter 12. This completes the description of the basic elements of table 30, as shown in FIGS. 1 and 2.

With further reference to FIG. 1, the mapper 24 can also include a comparator 32 and an output block 34. The comparator 32 compares the partial result 26 with levels in the table 30. For instance, the comparator 32 can identify the level in table 30 closest to the partial result 26.

The output block 34 generates the mapped constellation signal 18. The mapped constellation signal 18 is selected from the levels in the basic constellation even though the partial result may be a level outside the basic constellation. In particular, the mapped constellation signal 18 output by the block 34 is equal to the identified level closest to the partial result 26 if the identified level is inside the basic constellation. Alternately, if the identified level is outside the basic constellation, then the mapped constellation signal 18 is set equal to the sum of the partial result and a mapping distance signal. The mapping distance signal equals the distance between the index basic_const, associated with the basic constellation level of the input signal, and the index positive_const, associated with a level outside the basic constellation. Further details on determining the mapping distance are discussed under the description of FIG. 4.

FIG. 1 also illustrates details of the feedback filter 12. The feedback filter can include one or more delay elements D1, D2, . . . , DN, and the feedback filter can include one or more weighting elements a1, a2, . . . , aN. The feedback filter 12 thus provides feedback connections whose weighting coefficients are a1, a2, . . . , aN. The feedback filter 12 can be used to model an impulse response of a communication channel over which the input signal 20 is transmitted.

Figure 3:
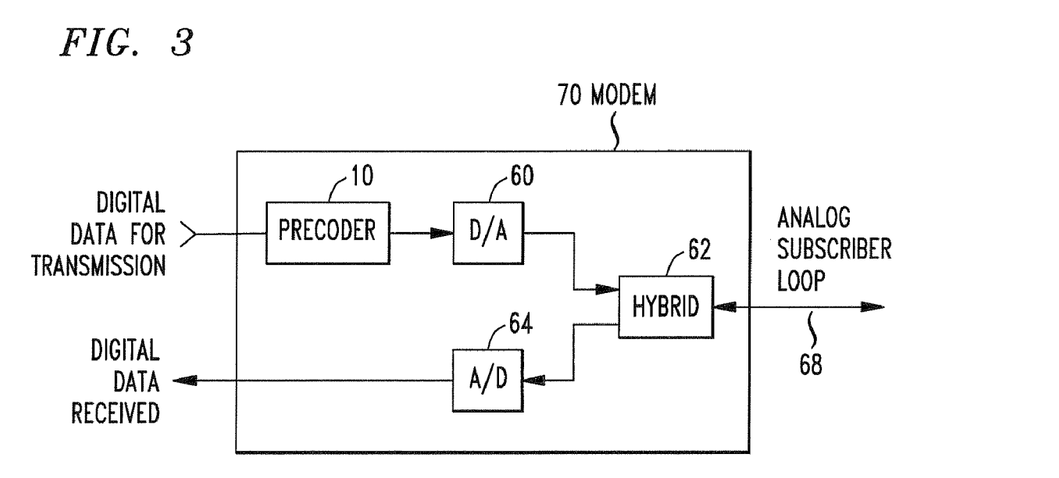
FIG. 3 is a block diagram illustrating the precoder of FIG. 1 in a modem.

FIG. 3 is a block diagram illustrating the precoder 10 of FIG. 1 in a modem 70. The modem 70 includes the precoder 10, a digital to analog converter 60 ("D/A"), a hybrid 62, and an analog to digital converter 64 ("A/D"). An analog subscriber loop 68 operably couples the modem 70 to a PSTN.

The hybrid 62 operably couples the modem 70 to the analog local loop 68. A hybrid can generally be described as a passive device used for converting a dual analog signal that is carried on one pair of conductors (i.e. the analog local loop) to separate analog signals that are carried on two pairs of conductors. Those skilled in the art are familiar with the use and operation of hybrid devices and, thus, a detailed description thereof is not necessary to enable one of skill in the art to make and practice the present invention.

The D/A converts digital signals to analog signals for transmission over the analog local loop, and the A/D converts analog signal received from the analog local loop to digital signals. The A/D converter and the D/A converter can also be described as capable of implementing a CODEC (coder/decoder) function. In one embodiment of the invention, the A/D implements a mu-law CODEC. Those skilled in the art are familiar with the non-linear mu-law and A-law signal compression algorithms. The mu-law algorithm includes 255 discrete signal conversion values; A-law uses 256 values. The broad principles of the invention are not, however, limited to a specific quantization scheme.

For instance, the A/D converter can utilize 255 non-uniformly spaced quantization levels, which are closer together for small analog signal values and spread further apart for large signal values, to convert an analog signal received from the analog local loop to one of 255 unique "symbols" or "levels". A DSP in the modem then uses a symbol table to convert the received symbol back to the data transmitted by the Central Office over the analog subscriber loop.

Figure 4:
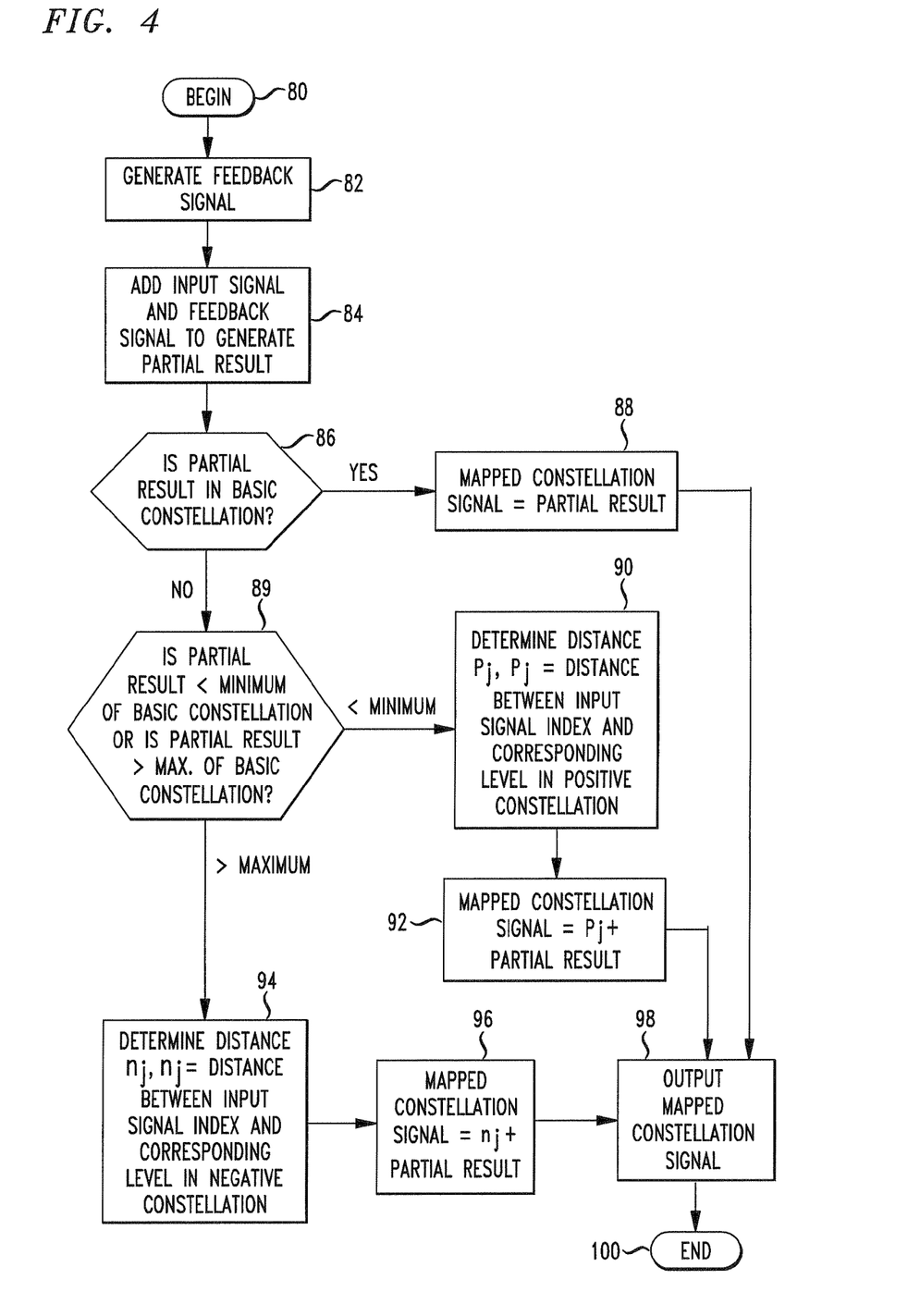
FIG. 4 is a flow chart illustrating the preceding method in accordance with the present invention.

FIG. 4 is a flow chart illustrating the method of preceding an input signal to generate a mapped constellation signal, in accordance with the present invention. The method includes generating a feedback signal from the mapped constellation signal at step 82, and performing a discrete modulo operation on the feedback signal and the input signal at steps 86-100. The discrete modulo operation is based upon an index to the constellation of levels chosen for the precoder, such that the amplitude of the mapped constellation signal is limited.

FIG. 4, also shows that the discrete modulo operation can include the steps of adding together the input signal and the feedback signal to generate a partial result at step 84, determining whether the generated partial result is contained within a basic constellation of levels at step 86, and generating the mapped constellation signal by mapping a partial result outside the basic constellation of levels onto a level inside the basic constellation of levels as a function of the index to the levels, at steps 89-100.

In particular, at step 86 the method determines whether the partial result calculated in step 84 is in the basic constellation 42. This can be implemented by comparing the partial result to entries in the table 30. If the partial result is in the basic constellation 42, then processing proceeds to step 88, otherwise processing proceeds to step 89.

At step 88, the mapped constellation signal is set equal to the partial result 88. For instance, if the partial result is in the basic constellation, then feedback has not caused the partial result to be out of range and accordingly no mapping is required. After step 88, processing proceeds to step 98.

At step 89, the method determines whether the partial result is less than the minimum of the basic constellation or whether the partial result is greater than the maximum of the basic constellation. If the partial result is less than the minimum of the basic constellation, then the method branches to step 90. If the partial result is greater than the maximum of the basic constellation, then the method branches to step 94.

At step 90, the method determines the mapping distance $p_j$. The mapping distance $p_j$=the distance between an index basic_const and the index positive_const. The index basic_const is the index associated with the basic constellation level of the input signal, and the index positive_const is an index associated with a level found in the positive constellation 44 of FIG. 2. In particular, the index positive_const is the index in the positive constellation 44 that maps onto the basic constellation level of the input signal. The index positive_const can be obtained from the table 30. After step 90, processing proceeds to step 92.

At step 92, the mapped constellation signal is set equal to the sum of the mapping distance $p_j$ and the partial result. After step 92, processing proceeds to step 98.

At step 94, which is reached from step 89, the method determines the mapping distance $n_j$. The mapping distance $n_j$=the distance between an index basic_const and an index negative_const. The index basic_const is the index associated with the basic constellation level of the input signal, and the index negative_const is an index associated with a level found in the negative constellation 46 of FIG. 2. In particular, the index negative_const is the index in the negative constellation 46 that maps onto the base constellation level of the input signal. The index negative_const can be obtained from the table 30. After step 94, processing proceeds to step 96.

At step 96, the mapped constellation signal is set equal to the sum of the mapping distance $n_j$ and the partial result. After step 96, processing proceeds to step 98.

At step 98, the precoder 10 outputs the mapped constellation signal 18. At step 100, the method ends.

Exemplary Operation of the Precoding Method:

A) Let's say the desired sequence to be transmitted

2,−2,−2,2,1,−1,−2,2

B) Let's also assume that our feedback filter coefficients are 1 and −1 so what is to be transmitted is the current input signal minus the previously transmitted sample, then C) With the first input signal=2, then the first output of the adder 22 (i.e. the partial result signal 26) is:

2−0=2 which is in range so it is transmitted as 2.

D) With the second input signal=−2, then the second output of the adder 22 (i.e. the partial result signal 26) is:

−2−2=−4

This value is out of range of the basic constellation 42, so it must undergo the discrete modulo operation outlined in steps 89-96 of FIG. 4. Using the table shown FIG. 2, we can identify that when the input signal=−2 the corresponding index in the positive constellation 44 is 3. Thus:

$p_j$=difference between the index of the input signal and the index associated with a level in the positive constellation that maps onto the basic constellation level of the input signal, and accordingly $p_j$=absolute value of [(−2)−(3)]=5.

Then, in accordance with step 92, the mapped constellation signal=$p_j$+partial result=5+(−4)=1.

So the second transmitted value is 1.

E) With the third input signal=−2, then the first output of the adder 22 (i.e. the partial result signal 26) is:

−2−1=−3.

This value is out of range of the basic constellation 42, so it must undergo the discrete modulo operation outlined in steps 89-96 of FIG. 4. Using the table shown in FIG. 2, we can identify that when the output signal=−2 the corresponding index in the positive constellation 44 is 3. Thus:

$p_j$=difference between the index of the input signal and the index associated with a level in the positive constellation that maps onto the basic constellation level of the input signal, and accordingly $p_j$=absolute value of [(−2)−(3)]=5.

Then, accordance with step 92, the mapped constellation signal=$p_j$+partial result=5+(−3)=2.

So the third transmitted value is 2.

F) The fourth input signal is 2, and the output of the adder 22 (i.e. the partial result signal 26) is:

2−2=0 which is in range so it is transmitted as 0.

G) The fifth input signal is 1, and the output of the adder 22 (i.e. the partial result signal 26) is:

1−0=1 which is in range so it is transmitted as 1.

H) The sixth input signal is −1, and the output of the adder 22 is:

−1−1=−2 which is in range so it is transmitted as −2.

Whenever a receiver in a digital modem receives a level in the positive or negative constellations, it maps the level to the corresponding level in the basic constellation as identified in the table 30. This mapping in the receiver can be formulated as a shift operation that is dependent on the level being transmitted. If the difference between the level in the basic constellation and the corresponding level in the negative constellation is n; then the mapping in the receiver from the negative constellation can be thought of as an addition of offset $n_j$ to the received value. Thus, if we completed the above example by showing the response in the receiver, we get the following:

| | |
|---|---|
| Transmitted Symbol Sequence | . . . 2, −2, −2, 2, 1, −1 . . . |
| Partial Result | . . . 2, −4, −3, 0, 1, 2 . . . |
| What is xmitted | . . . 2, 1, 2, 0, 1, −2 |
| Output of comm. Channel (i.e. what is received) | . . . 2, 3, 3, 2, 1, −1 |
| After Receiver mapping to basic constellation | . . . 2, −2, −2, 2, 1, −1 |

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and is not limiting.

What is claimed is:

1. A precoder for generating a mapped constellation signal from an input signal to be transmitted, comprising:
   a processing element configured to generate the mapped constellation signal from the input signal by mapping input signals in a plurality of distinct ranges onto a basic level, the processing element configured to map the plurality of distinct ranges onto the basic level following different arithmetic rules for at least two of the plurality of distinct ranges, wherein the different arithmetic rules are selected based on a level of the input signal.

2. The precoder according to claim 1, wherein the plurality of distinct ranges includes a first distinct range and a second distinct range, the first distinct range forming part of a first constellation having a first plurality of signal levels some of which are separated by a distance D1 and the second distinct range forming part of a second constellation having a second plurality of signal levels some of which are separated by a distance D2 that differs from D1.

3. The precoder according to claim 2, wherein the first and second constellations form a subset of the first and second plurality of the signal levels in a mu-law or A-law PCM decoding table.

4. The precoder according to claim 2, wherein a first arithmetic rule of the processing element maps the first distinct range onto the basic level by partitioning the first constellation into the first plurality of signal levels, some of the first plurality of signal levels being separated by the distance D1.

5. The precoder according to claim 1, wherein the basic level is one level within a basic constellation of levels and wherein the processing element is adapted to map each distinct range onto only one level inside the basic constellation of levels, such that a many-to-one mapping is created from each distinct range to a level inside the basic constellation of levels.

6. The precoder according to claim 1, wherein the precoder further comprises:
   a feedback filter adapted to generate a feedback signal as a function of the mapped constellation signal, and
   wherein the processing element includes a summer for adding the input signal and the feedback signal to generate a partial result, and a mapper that generates the mapped constellation signal from the partial result.

7. The precoder according to claim 6, wherein the mapper comprises:
   a table identifying a basic constellation of levels and a mapping from levels outside the basic constellation to levels inside the basic constellation.

8. The precoder according to claim 7, wherein the mapper further comprises an output block adapted to generate the mapped constellation signal equal to a level inside the basic constellation, if the identified level in the table closest to the partial result is inside the basic constellation.

9. The precoder according to claim 6, wherein the feedback filter includes a delay element and a weighting element such that the feedback filter multiplies a delayed version of the mapped constellation signal by the weighting element to generate the feedback signal.

10. A method of precoding an input signal to be transmitted to generate a mapped constellation signal, comprising:
    mapping the input signal contained in a first distinct range onto a basic level according to a first arithmetic rule;
    mapping the input signal contained in a second distinct range onto the basic level according to a second arithmetic rule that differs from the first arithmetic rule, wherein either the first or second arithmetic rule is selected based on a level of the input signal; and
    generating the mapped constellation signal based on said mappings, wherein each of the mapping steps and the generating step are performed by a modem.

11. The method of precoding according to claim 10, wherein the first distinct range forms part of a first constellation having a first plurality of signal levels some of which are separated by a distance D1 and the second distinct range forms part of a second constellation having a second plurality of signal levels some of which are separated by a distance D2 that differs from D1.

12. The method according to claim 11, further including the step of indexing the first constellation and mapping the first constellation onto a basic constellation of levels as a function of indexes.

13. The method of precoding according to claim 11, further comprising the steps of:
adding together the input signal and a feedback signal to generate a partial result, and
determining whether the generated partial result is contained within a basic constellation of levels; and
generating the mapped constellation signal if the partial result is contained within the basic constellation of levels.

14. The method of precoding according to claim 10, wherein the basic level is one level within a basic constellation of levels and wherein each of the mapping steps maps each distinct range onto only one level inside the basic constellation of levels, such that a many-to-one mapping is created from each distinct range to a level inside the basic constellation of levels.

15. The method according to claim 14, further comprising the step of generating the mapped constellation signal by mapping a partial result outside the basic constellation of levels onto a level inside the basic constellation of levels as a function of an index to the basic constellation of levels.

16. A processing element including a computer-readable medium having stored thereon a plurality of instructions, the plurality of instructions including instructions that when executed by the processing element cause the processing element to implement a method of precoding an input signal to generate a mapped constellation signal, the method comprising:
mapping the input signal contained in a first distinct range onto a basic level according to a first arithmetic rule; and
mapping the input signal contained in a second distinct range onto the basic level according to a second arithmetic rule that differs from the first arithmetic rule, wherein either the first or second arithmetic rule is selected based on a level of the input signal; and
generating the mappings, wherein each of the mapping steps and the generating step are performed by a modem constellation signal based on the mappings.

17. The processing element according to claim 16, wherein the first distinct range forms part of a first constellation having a first plurality of signal levels some of which are separated by a distance D1 and the second distinct range forms part of a second constellation having a second plurality of signal levels some of which are separated by a distance D2 that differs from D1.

18. The processing element according to claim 17, further including the step of indexing the first constellation and mapping the first constellation onto a basic constellation of levels as a function of the indexes.

19. The processing element according to claim 17, further comprising the steps of:
adding together the input signal and a feedback signal to generate a partial result, and
determining whether the generated partial result is contained within a basic constellation of levels; and
generating the mapped constellation signal if the partial result is contained within the basic constellation of levels.

20. The processing element according to claim 16, wherein the basic level is one level within a basic constellation of levels and wherein each of the mapping steps maps each distinct range onto only one level inside the basic constellation of levels, such that a many-to-one mapping is created from each distinct range to a level inside the basic constellation of levels.

* * * * *